(No Model.)
G. D. BURDINE.
COMBINED SEEDER AND FERTILIZER DISTRIBUTER.
No. 435,032. Patented Aug. 26, 1890.
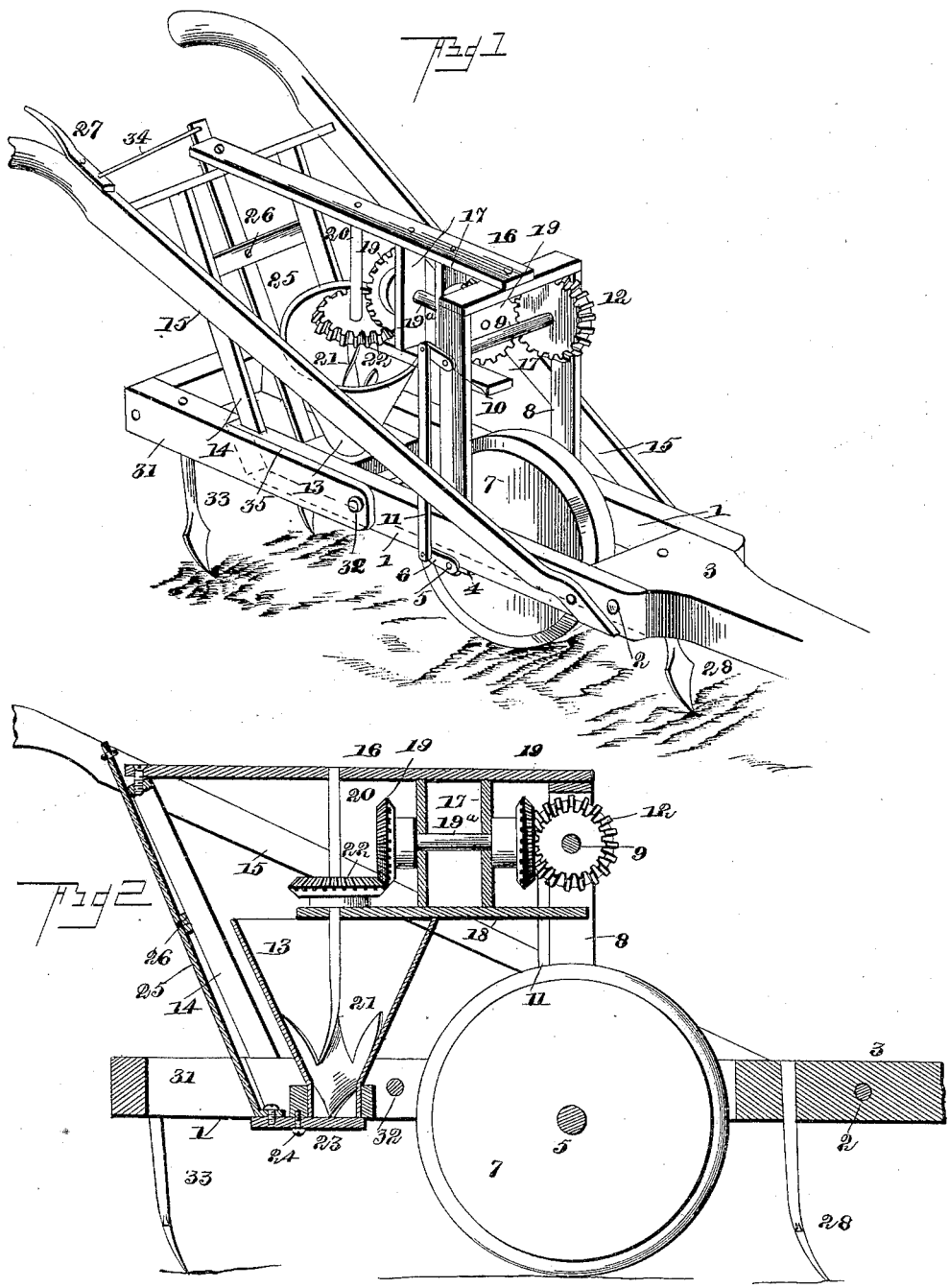

UNITED STATES PATENT OFFICE.

GEORGE D. BURDINE, OF MAGNOLIA, ARKANSAS.

COMBINED SEEDER AND FERTILIZER-DISTRIBUTER.

SPECIFICATION forming part of Letters Patent No. 435,032, dated August 26, 1890.

Application filed March 25, 1890. Serial No. 345,220. (No model.)

*To all whom it may concern:*

Be it known that I, GEORGE D. BURDINE, a citizen of the United States, residing at Magnolia, in the county of Columbia and State of Arkansas, have invented a new and useful Combined Seeder and Fertilizer-Distributer, of which the following is a specification.

This invention has relation to a combined seeder and fertilizer-distributer, and among the objects in view are to provide a cheap and simple machine adapted to open the furrows and positively feed the seed or fertilizer and re-cover the furrows, to provide means for regulating the flow of seed, and for permitting of the vertical movements of the supporting-wheel and frame-work supported thereby without imparting such movements to the covering-shovels.

With the above general objects in view the invention consists in certain features of construction, hereinafter specified, and particularly pointed out in the claims.

Referring to the drawings, Figure 1 is a perspective of a combined seeder and fertilizer-distributer constructed in accordance with my invention. Fig. 2 is a longitudinal vertical section of the same.

Like numerals of reference indicate like parts in all the figures of the drawings.

The opposite side bars 1 of the machine are connected at their front ends by a bolt 2, upon which is pivoted the tongue or draft-bar 3. Bearings 4 are formed upon the under side of the side bars 1, and in said bearings there is mounted a transverse axle 5, which beyond its bearings is provided with cranks 6. Mounted upon the side bars over the wheel 7 and upon the axle is a U-shaped frame 8, through the upper end of which there passes and is journaled a shaft 9, provided at its ends with oppositely-disposed cranks 10, which by rods 11 are connected to the cranks 6 of the axle 5, so that any movement of the wheel is communicated to its axle, and from thence through the connecting-rods to the shaft in the frame 8, which shaft is provided with a beveled gear 12.

13 represents the hopper, which is supported between the side bars 1, and is of funnel shape. In rear of the hopper there is located an upwardly-disposed inclined supporting-frame 14, the upper bar of which extends at each side and is connected to the opposite inclined handles 15, the front ends of which are bolted to the side bars 1 near their front ends, said handles being projected to the rear beyond the frame 14 and adapted to be grasped by the operator. A bar 16 connects the frame 14 at its upper end with the U-shaped frame 8, and depending from the same is a pair of vertical bars 17, connected at their lower ends by a horizontal bar 18, the bars 16, 17, and 18 forming a gear-supporting frame. A short horizontal shaft $19^a$ is mounted for rotation in the depending bars 17, and is provided at opposite ends with beveled gears 19, the front gear meshing with the bevel-gear 12.

20 represents a vertical shaft, which is the feed-shaft of the machine, and the same is journaled in the two horizontal bars 16 and 18, the lower end of the shaft depending into the contracted neck of the funnel-shaped hopper 13 and being provided at said end with a screw-shaped feed-augur 21. Between the two bars 16 and 18 the shaft is provided with a beveled gear 22, which gives motion to the shaft, and in turn is operated by the rear gear 19.

23 represents a cut-off, pivoted, as at 24, under the hopper, one end of the cut-off being adapted for swinging over the opening in the hopper. A rod 25 is connected to the rear end of the cut-off and pivoted, as at 26, to the rear frame 14, and by a connecting-link 34 has its upper end connected with a pivoted lever 27, mounted upon one of the handle-bars 15.

A shovel 28 depends from the rear end of the tongue or draft-bar in advance of the wheel 7 and serves to open the furrow for the reception of the seed or fertilizer, the periphery of the wheel being rounded to adapt it for travel along the furrow.

The rear ends of the side frames 1 are undercut or inclined, as shown, and pivoted to the sides of the bars 1 is a U-shaped horizontal frame 31, a bolt 32 passing through the terminals of the frame into the side bars. The inner faces of the terminals of the U-shaped frame are recessed, as at 35, so as to receive and partially surround the ends of the side bars, the ends of the recess being inclined to fit under the undercut portions of said side bars, so that the seeder-frame may rise and fall as occasioned by the supporting-wheel passing over rough ground without disturbing the rear U-shaped frame. The rear U-shaped frame is provided at opposite sides with depending shovels 33, which travel at each side of the track or furrow opened by the advance shovel 28, so that the rear shovels tend to close the furrow opened by the advance shovel.

The operation of the seeder will be apparent from the above description. The supporting-wheel lending movement to its axle, the latter will, through the connecting-rods 11, rotate the transverse shaft 9 and its pinion 12, which pinion, meshing with the pinions 19, drives the feed-shaft, and the latter, terminating in the screw, serves to positively feed so much of the seed or fertilizer through the opening in the bottom of the hopper. The wheel, passing along the bottoms of the furrows, will of course meet with many obstructions in the way of stones, clods, &c., causing the same to rise and fall. Such rise and fall of the wheel, it will be apparent, will not in any way affect the positive feeding of the fertilizer or the seed, and by the construction described will not affect the uncovering and re-covering of the furrow, for the reason that by the time the wheel has reached the furrow the advance shovel has opened the same, and the rear frame, following after the wheel, hangs loosely and is only supported by the frame of the machine at its front end, leaving its rear end with the shovels free to move or drag in a horizontal direction, regardless of the movements of the seeder-frame.

From the above construction it will be apparent that I have provided an extremely light, easily manipulated, and efficient seeder or fertilizer-distributer, one in which the draft is light and can be managed with ease, and require but slight attention.

Having thus described my invention, what I claim is—

1. The combination, with the side bars of the seeder-frame, the rear ends of which are undercut, of a U-shaped frame, the terminals of which are recessed upon their inner faces to receive the ends of the side bars, the ends of the recesses being inclined to take under the ends of the side bars, the pivot-bolt for pivoting the U-shaped frame to the side bars, and opposite shovel-standards depending from the opposite sides and rear end of the U-shaped frame, substantially as specified.

2. In a machine of the class described, the combination, with the frame, an axle journaled therein and terminating in opposite cranks, a wheel mounted on the axle, a U-shaped frame mounted on the frame and straddling the wheel, a crank-shaft mounted in the frame, a gear mounted on the shaft, and connecting-rods connecting the cranks of said shaft with those of the axle, of a vertical frame arranged in rear of the wheel, opposite longitudinal bars connecting the front and rear frames and connected by depending bars, a short shaft mounted in the depending bars and provided with opposite gears, the front one of which meshes with that of the crank-shaft, a hopper of funnel shape, a vertical feed-shaft mounted in the horizontal bars, and a pinion mounted on the shaft meshing with the rear pinion of the short shaft, substantially as specified.

In testimony that I claim the foregoing as my own I have hereto affixed my signature in presence of two witnesses.

GEORGE D. BURDINE.

Witnesses:
T. A. MONROE,
JNO. T. OWSLEY.